United States Patent [19]
Saumweber et al.

[11] Patent Number: 6,041,897
[45] Date of Patent: Mar. 28, 2000

[54] MAGNETIC BRAKE LINEAR EDDY CURRENT BRAKE

[75] Inventors: Eckart Saumweber, Gauring; Heinrich Grautstück; Uwe Kröger, both of München, all of Germany

[73] Assignee: Knorr-Bremse System Fur Schienenfahrzeuge GmbH, Munich, Germany

[21] Appl. No.: 08/983,451

[22] PCT Filed: Apr. 30, 1997

[86] PCT No.: PCT/DE97/00908

§ 371 Date: Jan. 9, 1998

§ 102(e) Date: Jan. 9, 1998

[87] PCT Pub. No.: WO97/43161

PCT Pub. Date: Nov. 20, 1997

[30] Foreign Application Priority Data

May 10, 1996 [DE] Germany .............. 196 18 903

[51] Int. Cl.⁷ ........................................ B60L 7/28
[52] U.S. Cl. .............................. 188/165; 188/161
[58] Field of Search ............................. 188/161, 164, 188/165; 310/77, 105, 106; 335/279, 281, 297

[56] References Cited

U.S. PATENT DOCUMENTS

| | | |
|---|---|---|
| 3,723,795 | 3/1973 | Baermann .................. 310/93 |
| 3,805,927 | 4/1974 | Tolksdorf . |
| 3,840,096 | 10/1974 | Tolksdorf . |
| 4,122,922 | 10/1978 | Baermann .................. 188/165 |
| 4,144,954 | 3/1979 | Farello et al. . |
| 4,482,034 | 11/1984 | Baermann .................. 188/165 |
| 5,653,173 | 8/1997 | Fischer ...................... 104/124 |
| 5,668,421 | 9/1997 | Gladish ...................... 310/12 |
| 5,862,891 | 1/1999 | Kroger et al. ............. 188/165 |

FOREIGN PATENT DOCUMENTS

| | | |
|---|---|---|
| 802 215 | 8/1936 | France . |
| 2 098 116 | 3/1972 | France . |
| 2 366 970 | 5/1978 | France . |
| 37 43 934A1 | 4/1989 | Germany . |
| WO96/13419 | 5/1996 | WIPO . |

*Primary Examiner*—Chris Schwartz
*Attorney, Agent, or Firm*—Barnes & Thornburg

[57] ABSTRACT

A magnetic brake, particularly a linear eddy-current brake for rail vehicles, having a magnet yoke which extends substantially along the whole eddy-current brake, has a concave shape with respect to a plane rail in its installed position.

15 Claims, 2 Drawing Sheets

MAX. 1-5 mm CONCAVE ARCHING

MAX. 1-5 mm CONCAVE ARCHING

MAGNETIC BRAKE LINEAR EDDY CURRENT BRAKE

BACKGROUND AND SUMMARY OF THE INVENTION

The invention relates generally to a magnetic brake, and particularly a linear eddy-current brake for rail vehicles.

Increased attention is being paid to eddy-current brakes, particularly within the scope of the further development of high-speed trains. The reason is that, since these eddy-current brakes do not contact the rail when braking, they do not wear out and can therefore be maintained at reasonable cost. A short introduction into the technology of eddy-current brakes for rail vehicles—whose function is based on the law of induction—is found, for example, in the book by Saumweber, et al "AET—Archiv für Eisenbahntechnik" ("Archive for Railroad Technology"), Hestra Publishers, Volume 43, Chapter 2.5.2". Accordingly, eddy-current brakes consist of an iron yoke with several pole cores. Electric coils magnetically excite the brake such that magnetic north and south poles are formed in an alternating manner. When the excited eddy-current brake is moved over the rail—that is, when braking —, magnetic fields are formed which are caused by eddy currents and which result in the braking force.

The invention is aimed at improving the construction of eddy-current brakes.

The invention achieves this goal by providing a magnetic brake, particularly a linear eddy-current brake for rail vehicles, which has a magnet yoke extending almost along the whole length of the eddy-current brake and which, in the installed position, has a concave exterior shape at least toward the rail.

The invention is based on the recognition that the application forces generated during the operation of an eddy-current brake may lead to an elastic bending of the brake (see FIG. 4). Furthermore, the rail may bend because of the normal forces of the axles (see FIG. 5; for example, in the shunt area). In addition, the rail may, under certain circumstances, be raised slightly in the area of the shunts as a result of the attraction force of the magnets.

The above-described effects have the result that the air gap between the rail and the brake is not constant along the total length of the brake. When the air gap is adjusted, the minimal value in the center of the brake must be taken into account.

The invention remedies this effect in that the concave shaping results in a compensation of the bending in the sense of an at least largely uniform linear course of the air gap.

Advantageous further developments of the invention are found herein.

In the following, the invention will be explained in detail with reference to the drawing, in which case additional advantages of the invention are also illustrated.

DETAILED DESCRIPTION OF THE PREFERRED EMBODIMENTS

Figure 4:
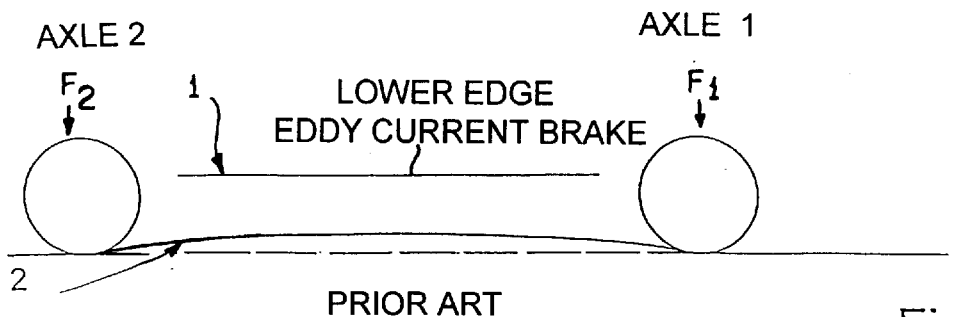
FIGS. 4 and 5 are views of the effect of the bending of the rail and the brake according to the state of the art.
Figure 5:
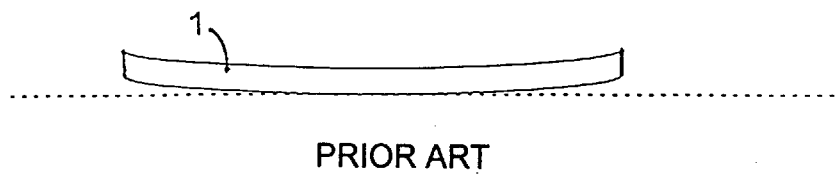
Figure 1:
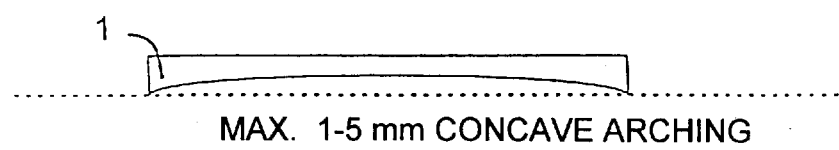
FIG. 1 is a schematic representation of a first embodiment of the invention.
Figure 2:
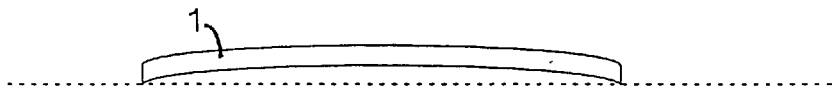
FIG. 2 is a schematic representation of a second embodiment of the invention.

FIG. 1 will be described first. FIG. 1 is a schematic representation of an eddy-current brake 1 which has a concave shape on its underside pointing to the rail 2 (such as the milled-out area of the magnet yoke ranging from 0 mm at the edge to 1–5 mm in the center of the brake). FIG. 2 shows a variant of this idea in the case of which the brake is plasmically preformed such that a concave deformation is created toward the rail 2. As the result of the invention, the effect of the bending of the brake during the operation is compensated in an uncompleted manner; for, if the brake is bent during the operation by approximately 5 mm, it will be virtually plane in the operation if it is correspondingly preformed.

Figure 6:
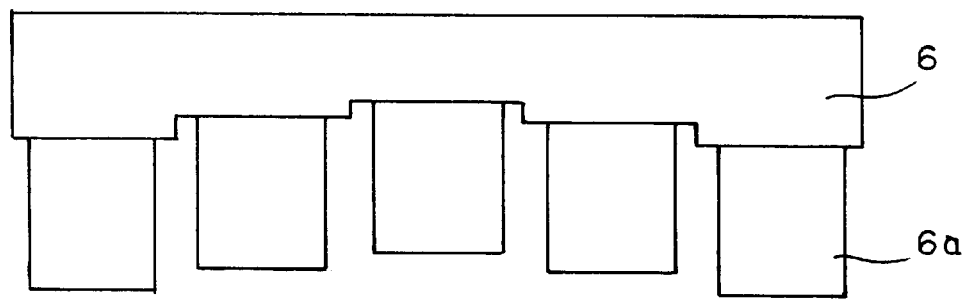
FIG. 6 is a schematic representation of a stepped embodiment.
Figure 7:
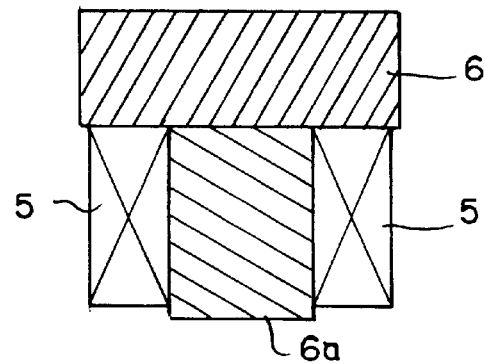
FIG. 7 is a schematic cross section of a stepped embodiment of FIG. 6 with stepped coils.

The concave shape preferably extends in a continuous manner. However, as an alternative, stepped construction can also be implemented as shown in FIG. 6; for example, another stepped construction could be that coils 5 are used on yoke 6 with pole cores 6a which have different heights.

Figure 8:
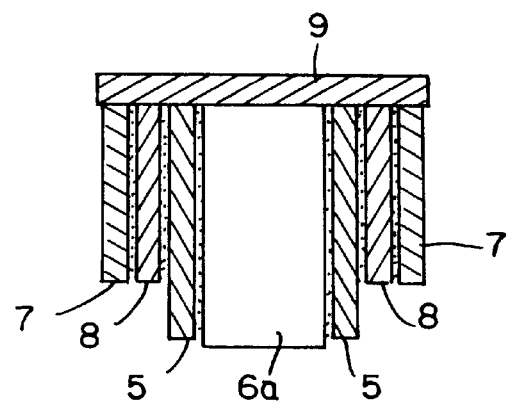
FIG. 8 is a cross section including a protective housing.

In the case of the invention, it was also found to be advantageous for the coils to be designed as individual coils vacuum-cast by means of casting resin. Preferably as shown in FIG. 8, a welded protection box 7 with a wall thickness of from 0.5 to 1.5 mm is provided as well as an insulation 8 thickness between the coils 5 and the protection box 9 of 1±0.5 mm. On its underside, the pole core 6a projects 2 to 15 mm out of the protection box 7 and therefore also carries out the function of a pole flange. Finally, it was found to be advantageous to weld (a) the pole core 6a and the protection box 7 together on their top sides in a flush manner so that the yoke 6 and the pole core 6a have a flush contact while maximally utilizing the winding space for the coil. A pole pitch with t=170 mm±10 mm is also advantageous.

Figure 3:
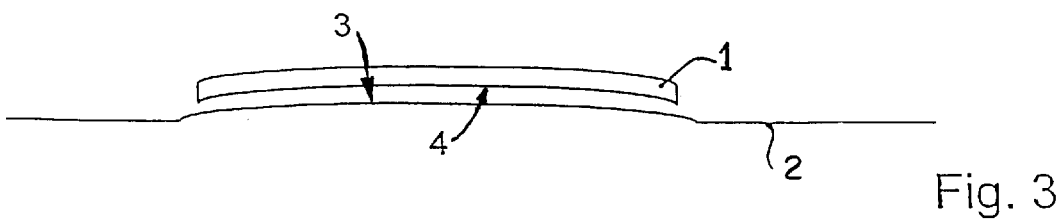
FIG. 3 is a schematic representation of the operating method of the invention.

FIG. 3 illustrates that, as the result of the concave shape (particularly in the shunt area), a constant air gap is formed between the upper rail edge 3 and the lower brake edge 4. In this cased, the brake is concavely preformed to such an extent that, in the operation, it adapts to the bending-up of the rail. This naturally does not prevent bendings of the rails caused, for example, by bogies. However, because of the concave preforming, an eddy-current brake is obtained which approaches the ideal pattern of a constant course of the gap.

We claim:

1. A linear eddy-current brake for rail vehicles comprising:
   coils; and
   a magnet yoke extending substantially along the whole length of the eddy-current brake, the yoke having an exterior shape which, in the installed condition, is concave at least toward the rail along with the length of the yoke.

2. A linear eddy-current brake according to claim 1, wherein the concave shape has a continuous course.

3. A linear eddy-current brake according to claim 1 wherein the concave shape is stepped.

4. A linear eddy-current brake according to claim 1, wherein the concave shape is formed by milling-out of the magnet yoke.

5. A linear eddy-current brake according to claim 1, wherein the concave shape is formed by coils of different heights along the length of the yoke.

6. A linear eddy-current brake according to claim 1, wherein the coils are constructed as individual resin vacuum-cast coils.

7. A linear eddy-current brake according to claim 1 including a welded protection box with a wall thickness of from 0.5 to 1.5 mm.

8. A linear eddy-current brake according to claim 7, including an insulation thickness between the coils and the protection box of 1±0.5 mm.

9. A linear eddy-current brake according to claim 7, including a pole core which, on its underside, projects 2 to 15 mm out of the protection box and therefore also exercises the function of a pole flange.

10. A linear eddy-current brake according to claim 9, wherein the pole core and the protection box are welded together flush on their top sides so that the yoke and the pole core have a flush contact while maximally utilizing the winding space for the coil.

11. A linear eddy-current brake according to claim 1, wherein the concave shape with respect to a plane in the center of the brake has a depth of from 1 to 5 mm.

12. A linear eddy-current brake according to claim 1, including a pole core which, on its underside, projects 2 to 15 mm out of a protection box and therefore also exercises the function of a pole flange.

13. A linear eddy-current brake according to claim 12, wherein the pole core and the protection box are welded together flush on their top sides so that the yoke and the pole core have a flush contact while maximally utilizing the winding space for the coil.

14. A linear eddy-current brake according to claim 1, including a pole core and a protection box welded together flush on their top sides so that the yoke and the pole core have a flush contact while maximally utilizing the winding space for the coil.

15. A linear eddy-current brake according to claim 1, wherein the concave shape is formed by plastically performing or by a plastic deformation of the magnet yoke.

* * * * *